United States Patent
Stahl et al.

(10) Patent No.: US 9,804,746 B2
(45) Date of Patent: Oct. 31, 2017

(54) ACTIONABLE USER INPUT ON DISPLAYED ITEMS

(71) Applicant: BlackBerry Limited, Waterloo (CA)

(72) Inventors: Jonathan Stahl, Malmo (SE); Mikael Ainalem, Malmo (SE); Henrik Sandström, Hassleholm (SE)

(73) Assignee: BlackBerry Limited, Waterloo, Ontario (CA)

( * ) Notice: Subject to any disclaimer, the term of this patent is extended or adjusted under 35 U.S.C. 154(b) by 531 days.

(21) Appl. No.: 13/946,413

(22) Filed: Jul. 19, 2013

(65) Prior Publication Data

US 2015/0026612 A1    Jan. 22, 2015

(51) Int. Cl.
*G06F 3/048* (2013.01)
*G06F 3/0484* (2013.01)
*G06F 3/0488* (2013.01)

(52) U.S. Cl.
CPC .......... *G06F 3/0484* (2013.01); *G06F 3/0488* (2013.01); *G06F 3/04883* (2013.01)

(58) Field of Classification Search
CPC ...................................................... G06F 3/048
See application file for complete search history.

(56) References Cited

U.S. PATENT DOCUMENTS

2005/0144561 A1\* 6/2005 Moody ................ G06Q 10/107
715/739
2009/0177981 A1\* 7/2009 Christie .............. G06F 3/04883
715/758
2009/0278806 A1\* 11/2009 Duarte ................. G06F 3/0416
345/173
2012/0062564 A1\* 3/2012 Miyashita ............. G06F 1/1626
345/419
2013/0227482 A1\* 8/2013 Thorsander ........... G06F 3/0482
715/821

(Continued)

FOREIGN PATENT DOCUMENTS

WO    2008/030975 A1    3/2008

OTHER PUBLICATIONS

Extended European Search Report from related European Patent Application No. 14177729.2 dated Dec. 10, 2014; 9 pages.

(Continued)

*Primary Examiner* — Xuyang Xia
(74) *Attorney, Agent, or Firm* — Donna Flores; Fleit Gibbons Gutman Bongini & Bianco, P.L.

(57) ABSTRACT

There is provided a method in an electronic device having a display and means for receiving user input, the method comprising detecting a user input directed at an item displayed on a display and determining whether the user input is a first user input or a second user input, wherein the first user input is different in at least one respect from the second user input. If the item is linked to one or more additional items and the detected user input is the first user input, the method comprises selecting the item and the one or more additional items as a group of items, for performing an action on the group of items. If the detected user input is the second user input, the method comprises selecting the item for performing the action on the item and no other item. There is also provided an electronic device comprising processing circuitry which is configured to carry out the method.

33 Claims, 5 Drawing Sheets

(56) References Cited

U.S. PATENT DOCUMENTS

2014/0351756 A1* 11/2014 Wu .................... G06F 3/04817
                                                                   715/811

OTHER PUBLICATIONS

Extended European Search report dated Nov. 26, 2015, received for European Application No. 14177729.2.
European Office Action dated Apr. 18, 2017, received for European Application No. 14177729.2.
Response filed on Feb. 14, 2017 for European Office Action dated Dec. 6, 2016, received for European Application No. 1477729.2.
European Office Action dated Dec. 6, 2016, received for European Application No. 1477729.2.

* cited by examiner

ACTIONABLE USER INPUT ON DISPLAYED ITEMS

TECHNICAL FIELD

The present disclosure relates to the selection of an item displayed on a display for performing an action on the item. In particular, it relates to the selection of an item by applying user input directed at the item.

BACKGROUND

It is common to display items on a display of an electronic device for user manipulation. The user is usually provided with a way of deleting one or more of the displayed items. The items that are displayed may be parent items that have one or more linked child items. If the parent item is deleted from the list, the one or more linked child items are deleted along with the parent item. There is no difference in the user input required to delete a parent item together with its linked child items and the user input required to delete a single item, e.g. a child item or a parent item without linked child items. The use of the same user input to delete a group of items (i.e. the parent item and its child items) or a single item can result in a user accidently deleting all child items when the parent item is deleted, which may result in an unintentional loss of information that may not be retrievable.

BRIEF DESCRIPTION OF THE DRAWINGS

The present disclosure can be understood with reference to the description of the embodiments set out below, in conjunction with the appended drawings in which.

DESCRIPTION

Figure 1:
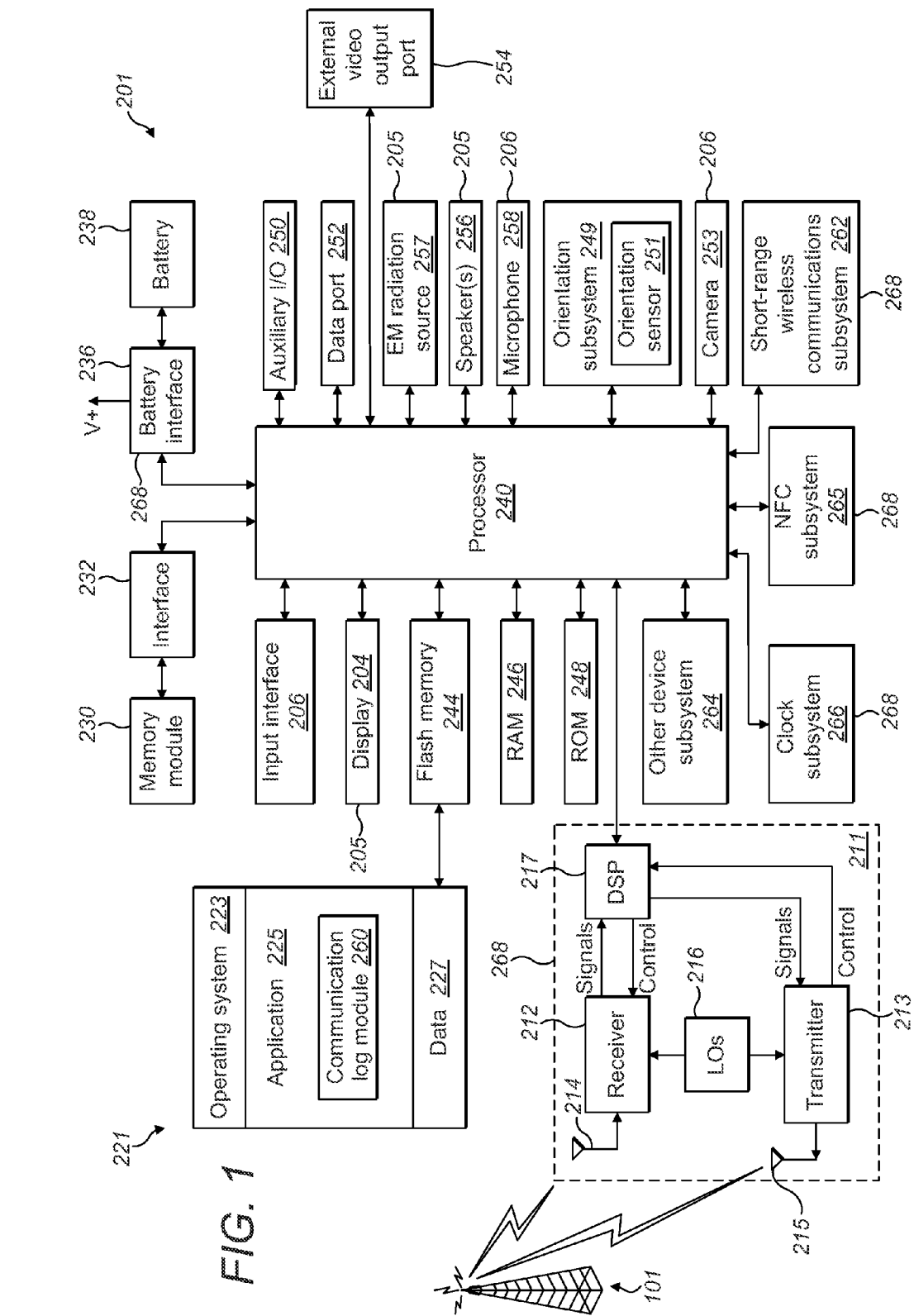
FIG. 1 is a schematic diagram illustrating components of an electronic device usable by a user.

The disclosure below is a description of one or more exemplary embodiments which are not intended to be limiting on the scope of the appended claims.

In a first aspect of this disclosure, there is provided a method in an electronic device having a display and means for receiving user input, the method comprising detecting a user input directed at an item displayed on a display and determining whether the user input is a first user input or a second user input, wherein the first user input is different in at least one respect from the second user input. If the item is linked to one or more additional items and the detected user input is the first user input, the method comprises selecting the item and the one or more additional items as a group of items, for performing an action on the group of items. If the detected user input is the second user input, the method comprises selecting the item for performing the action on the item and no other item.

Preferably, the method comprises determining whether the item displayed on the display is linked to one or more additional items. Upon a determination that the item is linked to one or more additional items and that the detected user input is the first user input, the method comprises selecting the item and the one or more additional items as a group of items, for performing an action on the group of items. Upon a determination that the detected user input is the second user input, the method comprises selecting the item for performing the action on the item and no other item. The step of determining whether the user input is a first user input or a second user input can be performed before or after the step of determining whether the item displayed on the display is linked to one or more additional items. The disclosure covers both orders in which the two steps can be performed.

The first user input may be a first gesture via a touch-sensitive input interface, and the second user input may be a second gesture input via the touch-sensitive input interface. The first gesture is accordingly different in at least one respect from the second gesture. Alternatively, the first and second user input may be user input received via a pointing device, such as, for example, a mouse, trackball, trackpad etc., for controlling a pointer on the display and may comprise one or more of predefined movements, e.g. movement in a particular direction for a predetermined distance, and/or one or more predetermined additional inputs, such as one or more detected button presses input via the pointing device.

The method may further comprise performing the action on the group of items in response to a determination that the item is linked to one or more additional items and that the detected user input is the first user input.

The method may further comprise performing the action on the item in response to a determination that the detected user input is the second user input.

The action performed is preferably the deletion of the item or the group of items.

Preferably, the first user input is of greater complexity than the second user input. The second user input may be shorter in time and/or distance than the first user input.

The first user input may comprise a first component and a second component and wherein application of the first component of the first user input selects the first item and application of the second component of the first user input performs the action on the group of items. The second user input may correspond to the first component of the first user input.

The item may be selected for performing the action on the item and no other item upon a determination that the item is not linked to one or more additional items and that the detected user input is the second user input.

Upon a determination that the item is linked to one or more additional items and that the detected user input is the second user input, the method may comprise selecting the item, for performing an action on the item and none of the one or more additional items The items are preferably indicative of messages.

The one or more additional items preferably comprise one or more sub items that are linked to the item.

The item may indicative of a message from a chain of messages and the one or more sub items are indicative of one or more additional messages of the chain of messages. The item is preferably indicative of the most recently received or sent message in the chain of messages. The item may be displayed in the display, with the sub items being hidden from view. The method may comprise displaying on the display the one or more sub items linked to the item when the item is selected by detection of the first user input. The one or more sub items may be displayed in a list on the display, alongside or together with the item.

In a second aspect of this disclosure, there is provided a computer-readable medium comprising executable instructions which, when executed, cause a processor to perform any one of the above methods. The executable instructions may be computer-executable instructions. A device may be configured to receive or process the executable instructions from the computer-readable medium, and/or comprise the executable instructions, and be configured to execute the executable instructions so as to perform the method. The computer-readable medium may be a non-transitory computer readable medium.

In a third aspect of this disclosure, there is provided an electronic device comprising a display configured to display an item and processing circuitry configured to receive as inputs a first user input and a second user input, wherein the first user input is different in at least one respect from the second user input. The processing circuitry is further configured to, in response to the receipt of the first user input directed at the item and if the item is linked to one or more additional items, select the item and the one or more additional items to perform an action on the group of items together; and in response to the receipt of the second user input directed at the item, select the item to perform the action on the item and no other item.

Preferably, the processing circuitry is further configured to determine whether the item displayed on the display is linked to one or more additional items. In response to the receipt of the first user input directed at the item and the determination that the item is linked to one or more additional items, the processing circuitry is configured to select the item and the one or more additional items to perform an action on the group of items together. In response to the receipt of the second user input directed at the item, the processing circuitry is configured to select the item to perform the action on the item and no other item. The processing circuitry can be configured to determine if the item is linked to one or more additional items before or after determining whether the user input is the first user input or the second user input. The disclosure covers both orders in which the two steps can be performed.

The first user input may be a first gesture input via the touch-sensitive input interface, and the second user input may be a second gesture input by the touch-sensitive input interface, wherein the first gesture is different in at least one respect from the second gesture. Preferably, the touch-sensitive interface is overlaid on the display. The first gesture may comprise a swipe on the touch-sensitive interface of a first length across the item displayed on the display and the second gesture may comprise a swipe on the touch-sensitive interface of a second length across the item displayed on the display, wherein the first length is different to the second length.

The action performed by the processing circuitry is preferably the deletion of the item or the group of items.

The processing circuitry may be configured to perform the action on the group of items in response to the receipt of the first user input directed at the item and the determination that the item is linked to one or more additional items.

The processing circuitry may be configured to perform the action on the item in response to the receipt of the second user input directed at the item and the determination that the item is not linked to one or more additional items.

The first user input may comprise a first component and a second component and wherein the processing circuitry is further configured to, in response to an input of the first component of the first user input directed at the item, select the item; and in response to an input of the second component of the first user input, perform the action on the group of items together. The second user input may correspond to the first component of the first user input.

Preferably, the first user input is of greater complexity than the second user input. The second user input may be shorter in time and/or distance than the first user input.

The processing circuitry may be further configured to select the item to perform the action on the item and no other item, in response to the receipt of the second user input directed at the item and the determination that the item is not linked to one or more additional items.

In response to the receipt of the second user input directed at the item and the determination that the item is linked to one or more additional items, the processing circuitry may be further configured to select the item to perform an action on the item and none of the one or more additional items.

Preferably, the items are indicative of messages.

Preferably, the one or more additional items comprise one or more sub items that are linked to the item.

The item may be indicative of a message from a chain of messages and the one or more sub items are indicative of one or more additional messages of the chain of messages. The item may be indicative of the most recently received or sent message in the chain of messages. The processing circuitry may be configured to display the item on the display, with the sub items being hidden from view. The processing circuitry may be configured to display on the display the one or more sub items linked to the item when the item is selected in response to input of the first user input. The processing circuitry may be configured to display the one or more sub items in a list on the display, alongside or together with the item.

In a fourth aspect of this disclosure, there is provided a computer-readable medium having stored thereon executable instructions which, when executed by processing circuitry, cause the processing circuitry to detect a user input directed at an item displayed on a display and determine whether the user input is a first user input or a second user input, wherein the first user input is different in at least one respect from a second user input. If the item is linked to one or more additional items and that the detected user input is the first user input, the processing circuitry is configured to select the item and the one or more additional items as a group of items, for performing an action on the group of items. If the detected user input is the second user input, the processing circuitry is configured to select the item for performing the action on the item and no other item.

Additional steps performed by the processing circuitry may include the steps of any one of the aforementioned method steps according to the first aspect.

The electronic device may be a computer device, such as a personal computer, laptop, tablet computer, and the second electronic device may be a wireless communication device, such as handheld communication device, for example: a mobile phone, e.g. smartphone; or tablet device.

Reference is made to FIG. 1 which illustrates an electronic device 201, such as a first and/or second electronic device, which is usable in accordance with the disclosure below.

The electronic device 201 may be a computer device, e.g. personal computer (PC) or laptop, a wireless communication device, such as handheld communication device, for example: a mobile phone, e.g. smartphone; or tablet device.

An electronic device 201 such as the electronic device 201 of FIG. 1 is configured to generate a user-controllable interface on a display, such as a built-in display and/or on a remote, external display device. In the context of this disclosure, the term "remote" means a display screen which is not built-in to the electronic device 201 with which the electronic device 201 communicates via a physical wired connection or via a wireless connection. The display is shown as display 204 built in to the electronic device 201 in FIG. 2 in which the electronic device 201 is a wireless communication device, and is also shown as external display device 300 in FIG. 3 in which the display 204 is separate to the electronic device 201.

It will be appreciated that, in certain embodiments, some of the features, systems or subsystems of the electronic device 201 discussed below with reference to FIG. 1 may be omitted from electronic devices 201 which are intended to perform solely operations in relation to the generation and output of display data on the display and the modification of media content output. However, a full disclosure of a number of features which may be present in the electronic device 201 is given below.

In one embodiment, the electronic device 201 is a computer, such as a personal computer (PC) or laptop, with electronic communication capabilities which enable it to communicate with other electronic devices (e.g. similar or identical to electronic device 201), networks and/or servers. In this regard, communication may be direct between devices or may take place over a network, such as the Internet. In both cases, communication may take place via as a short-range radio frequency link, e.g. Bluetooth, or via a data network, which may be wired (e.g. wired Ethernet) or may be wireless (e.g., WiFi using IEEE 802.11 radio standards).

In another embodiment, the electronic device 201 is a communication device, such as a wireless communication device, and may be a mobile or handheld device, such as a mobile or handheld communication device, for example having data and/or voice communication capabilities. It may also have the capability to communicate with other electronic devices (similar or identical to electronic device 201). In this regard, communication may be direct between the devices or may take place over a data network, such as the Internet. In both cases, communication may take place via as a short-range radio frequency link, e.g. Bluetooth, or via a data network, which may be wired (e.g. wired Ethernet) or may be wireless (e.g., WiFi using IEEE 802.11 radio standards).

Depending on the functionality provided by the electronic device 201, the electronic device 201 may be a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. It will be appreciated that the electronic device 201 may take other forms, including any one of the forms described herein. In addition, the electronic device 201 may take other forms apart from those specifically listed above. The electronic device 201 may also be referred to as a mobile, handheld or portable communications device, a communication device, a mobile device and, in some cases, as a device. In the context of this disclosure, the term "mobile" may mean that the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket.

The electronic device 201 includes processing circuitry being, or including, a processor 240 (such as a microprocessor), which can control the operation of the electronic device 201. In certain electronic devices, more than one processor is provided forming the processing circuitry, with each processor in communication with each other and configured to perform operations in parallel, so that they together control the overall operation of the electronic device. For the purposes of the present disclosure, reference is made to processor 240; however this can also be intended as a reference to processing circuitry, for example in which more than one processor performs the disclosed function or functions.

The processor 240 interacts with device subsystems, such as a communication subsystem 211, which may be wired or wireless, but which is shown in FIG. 1 in exemplary form as a wireless communication subsystem for exchanging radio frequency signals via a wireless network 101 to perform communication functions. The processor 240 is communicably coupled with additional device subsystems including one or more output interfaces 205 (such as one or more of: a display 204 (built-in, or remote), a speaker 256, electromagnetic (EM) radiation source 257), one or more input interfaces 206 (such as one or more of: a camera 253, microphone 258, keyboard (not shown), control buttons (not shown), a navigational input device (not shown), such as a pointer device, e.g. mouse, a touch-sensitive overlay (not shown)) associated with a touch-sensitive interface, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 1 perform communication-related functions, whereas other subsystems may provide "resident" or on-device functions.

The electronic device 201 stores data 227 in an erasable persistent memory, which in one embodiment is the flash memory 244. In various embodiments, the data 227 includes service data including information used by the electronic device 201 to establish and maintain communication with the wireless network 101. The data 227 may also include user application data such as electronic messages (e.g. email, SMS etc.), address book and contact information, calendar and schedule information, notepad documents, presentation documents and information, word processor documents and information, spreadsheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as a message application (e.g. email, SMS etc.), an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, messages, such as email or SMS messages, contact records, and task items may be stored in individual databases within the device memory.

The electronic device 201 includes a clock subsystem or module 266 comprising a system clock configured to measure system time. In one embodiment, the system clock comprises its own alternate power source. The system clock provides an indicator of a current time value, the system time, represented as a year/month/day/hour/minute/second/milliseconds value. In other embodiments, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together may form a status report subsystem which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In certain embodiments, the external video output port 254 is integrated with the data port 252. The external video output port 254 may be configured to connect the electronic device 201 via a wired connection (e.g. video graphics array (VGA), digital visual interface (DVI) or high definition multimedia interface (HDMI)) to an external (or remote) display device 300 which is separate and remote from the electronic device 201 and its display 204. The processor 240 outputs external display data generated by the processor 240 via the external video output port 254, such that the external display device 300 can display application data from the memory module in a predetermined way on an external display screen of the external display device 300. The processor 240 may also communicate the external display data to the external display device 300 in a similar fashion over a wireless communications path (for example via Miracast™). The wireless communication path may be supported by Intel® WiDi. At any given time, the display data and the external display data generated by the processor 240 may be identical or similar for a predetermined period of time, but may also differ for a predetermined period of time, with the processor 240 controlling whether the display data and the external display data are identical or differ based on input from one or more of the input interfaces 206. In this context, the word "identical" means that both sets of data comprise similar content so as to generate an identical or substantially similar display at substantially the same time on both the external display device 300 and the display 204. In this context, the word "differ" means that the external display data and display data are not identical; this is to say that these data may (but not necessarily) include identical elements of data, for example representative of the same application data, but the external display data and display data are not wholly identical. Hence, the display on both the external display device 300 and the display 204 are not wholly identical, although similar or identical individual items of content based on the application data may be displayed on both the external display device 300 and the display 204. Either one of the display 204 or external display device 300 may be optional. References made herein to data displayed by the display 204 are intended to include references to data displayed on the display of the external display device 300, and vice-a-versa, whether or not one or other of the display 204 or external display device 300 are present.

The electronic device 201 includes an input interface 206 (for example: a pointing device, such as a mouse, trackpad, trackball etc.; and/or touch-sensitive interface, such as an interface overlaid on display 204) in communication with the processor 240. The pointing device, if present, may be built-in to electronic device 201, e.g. as a trackpad or trackball, or may be connected to the device 201, including its processor 240 via one or more of: the data port 252, the communication subsystem 211, the auxiliary input/output (I/O) subsystems 250, and the short-range wireless communications subsystem 262. The touch-sensitive interface, if present, may be constructed using a touch-sensitive input surface which is connected to processor 240 an electronic controller and which overlays the display 204. The touch-sensitive input surface and the electronic controller provide a touch-sensitive input interface 206 and the processor 240 interacts with the touch-sensitive overlay via the electronic controller. The input interface 206 may control the position of a pointer displayed on the display 204. The input interface 206 generally provides positional information of current or intended user input on the display 204, e.g. the position of a touch input on the touch-sensitive surface, if present, or the position of the pointer, if present, on the display 204.

The processor 240 may be in communication with the memory and input interface 206 to detect user input via the input interface 206. The processor 240 can then generate or update display data comprising a display object, e.g. a pointer or notification, for display by the display device 204 in accordance with the user input. The processor 240 then outputs the display data for display on the display device 204. In an embodiment, the user input may comprise one or more gestures made across the touch-sensitive interface with input interface 206.

If the input interface 206 comprises the pointing device mentioned above, the input detected by the pointing device may comprise any suitable user-based input. For example, the input may comprise one or more inputs including, for example: a continuous movement of the pointing device to cause user input (e.g. of a pointer displayed on the display 204) to be in one or more particular directions across the display 204, the pressing of one or more buttons of the pointing device, a scrolling command input by the pointing device, and any other user input received with the pointing device. It will be appreciated that the input may comprise a sequence of input elements or stages performed with the pointing device within a specified or predetermined time frame, for example: a double press of a button on the pointing device in which each press comprises an element (or a sub-input, a phase or a stage) of the input and the button presses are performed within a time frame that enables the processor 240 to detect the presses as elements of a single input; or a number of discrete phases of continuous movement of the pointing device in different directions across the display 204 in which each movement comprises an element (or a sub-input, a phase or a stage) of the user input and the movement elements are performed within a time frame that enables the processor 240 to detect movements as a single input indicative of movement in a general direction across the display.

If the input interface 206 comprises the touch-sensitive surface mentioned above, the input detected by the touch-sensitive surface interface may comprise any suitable user touch-based input. For example, the input may comprise one or more gestures as an input such as a tap, a multi-tap, a long press, a swipe or scroll or slide, a pan, a flick, a multi-swipe, a multi-finger tap, a multi-finger scroll or swipe, a pinch, a two-hand pinch, a spread, a two-hand spread, a rotation, a two-hand rotation, a slide and rotation, a multi-direction slide, a multi-finger slide and rotation, a multi-finger slide, etc. It will be appreciated that the gesture input may comprise a sequence of input elements or stages performed within a specified or predetermined time frame, for example, a three-tap gesture in which each tap comprises an element (or a sub-input, a phase or a stage) of the input and the three taps are performed within a time frame that enables the processor 240 to detect the taps as elements of a single input. Additionally or alternatively, an input may comprise removing a point of contact, e.g., a finger or stylus, from the touch-sensitive interface interface.

Many examples described herein refer to a gesture detected by the touch-sensitive interface, but other methods of gesture detection may be used. For example, a gesture may be a generalized trajectory description characterized as a sequence of 3D points in time, and as such many different sensors of the electronic device 201 may be utilized to detect such a gesture. The gesture may be performed by moving a portable electronic device or moving one or more body parts, such as fingers or thumbs as a 3D spatial gesture. For example, sensors, such as an accelerometer/gyroscope, or proximity sensors, or time-of-flight cameras may detect such gestures. Gesture recognition and detection techniques of this type are known. An accelerometer or gyroscope may be utilized to detect 3D spatial gestures. A sequence of acceleration values may be detected in the different spatial dimensions as a function of time and constitute trajectory information that can be recognized as a gesture. For example, a quick flick and a tilt of the portable electronic device are examples of detectable gestures. A 3D spatial gesture includes a continuous movement, a sequence of movements, and a series of continuous movements or sequences of movements. Proximity sensors, optical sensors, and/or cameras may be utilized to detect 3D spatial gestures comprising motion of objects spaced from the device.

A gesture input may be different to input of a command by manipulation of a control component presented on the screen because a gesture input can be performed at any location within the display screen (or a large area of the display screen) in contrast to a single contact point for a user finger or input stylus on a corresponding control element. In order to input a command using a control component, the user must contact the screen at a specific location corresponding to that component. For example, in order to change an output volume using a volume control, the user must select the volume control by touching the location at which the volume control is displayed and moving the displayed control element by a desired amount through movement of the user's finger across the screen. Such user input must therefore be precisely controlled in order to use control elements to input commands. Gesture-based inputs, on the other hand, do not require the same precise control as they are not tied to a specific location on the screen. Instead, a user wishing to, e.g., scroll through a list of media content can do so by performing a swipe gesture at any location within a media-player display.

In at least some embodiments, the touch-sensitive surface has a touch-sensitive surface which is larger than the display 204. For example, in at least some embodiments, the touch-sensitive overlay may extend overtop of a frame (not shown) which surrounds the display 204. In such embodiments, the frame (not shown) may be referred to as an active frame since it is capable of acting as part of the input interface 206. In at least some embodiments, the touch-sensitive overlay may extend to the sides of the electronic device 201.

As noted above, in some embodiments, the electronic device 201 includes a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217 which is in communication with the processor 240. The antenna elements 214 and 215 may be embedded or internal to the electronic device 201 and a single antenna may be shared by both receiver and transmitter. The particular design of the communication subsystem 211 depends on the wireless network 101 in which electronic device 201 is intended to operate.

In at least some embodiments, the electronic device 201 communicates with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for providing direct communication of data with and between the device 201, including, for example, its processor 240, and another electronic device, which may be similar or identical to electronic device 201.

In at least some embodiments, the electronic device 201 may also include a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer. The orientation sensor 251 may generate orientation data which specifies the orientation of the electronic device 201. The orientation data, in at least some embodiments, specifies the orientation of the device 201 relative to the gravitational field of the earth. Additionally or alternatively, the orientation sensor 251 may generate orientation data which specifies the orientation of the device relative to known locations or fixtures in a communication network. In some embodiments, the orientation subsystem 249 includes other orientation sensors 251, instead of or in addition to accelerometers. For example, in various embodiments, the orientation subsystem 249 may include a gravity sensor, a gyroscope, a tilt sensor, an electronic compass or other suitable sensor, or combinations thereof. In some embodiments, the device orientation subsystem 249 may include two or more orientation sensors 251 such as an accelerometer and an electronic compass. The orientation subsystem 249 may provide input to the input interface 206, such that, for example, three-dimensional gestures performed with the electronic device 201 as a whole may be detected and provide user input to the processor 240.

The electronic device 201, in at least some embodiments, may include a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 may include a microphone or one or more speakers. In at least some embodiments, an electronic device 201 includes a plurality of speakers 256. For example, in some embodiments, the electronic device 201 includes two or more speakers 256. The two or more speakers 256 may, for example, be disposed in spaced relation to one another. That is, in at least some embodiments, the electronic device 201 may include a first speaker and a second speaker and the first speaker and the second speaker may be spatially separated from one another within the electronic device 201. In at least some embodiments, the display 204 may be disposed between the first speaker and the second speaker of the electronic device. In such embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In at least some embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such embodiments, the direction of capture of the camera is always predictable relative to the display 204 or the housing. In at least some embodiments, the camera may be provided in a central location relative to the display 204 to facilitate image acquisition of a face.

In at least some embodiments, the electronic device 201 includes an electromagnetic (EM) radiation source 257. In at least some embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some embodiments, the electromagnetic radiation source 257 is an infrared (IR) radiation source which is configured to emit infrared radiation. In at least some embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some embodiments, the camera 253 is configured to capture at least some electromagnetic radiation which is not in the visible spectrum.

In some embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 may automatically be sent over the USB cable Bluetooth® connection to the host computer system for processing.

The electronic device 201 may also include a power source 238, which may be a wired power supply, such as mains supply, or battery, for example one or more rechargeable batteries that may be charged for example, through charging circuitry coupled to a battery interface 236 such as the data port 252. The power source 238 provides electrical power to at least some of the electrical circuitry in the electronic device 201, and the power interface 236 provides a mechanical and electrical connection for the power source 238. The power interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some embodiments, the short-range communication subsystem 262 is a wireless bus protocol compliant communication mechanism such as a Bluetooth® communication module to provide for communication with similarly-enabled systems and devices.

Any one or more of the communication subsystem 211, the auxiliary input/output (I/O) subsystems 250, the NFC subsystem 265, the short-range wireless communications subsystem 262, and data port 252 may serve as the "communication subsystem 211" (also designated as communication subsystem 268 in FIG. 1) for passing data to/from the processor 240 and remote devices (similar or identical to device 201) and/or communication networks. For example, these subsystems may be configured to receive, process and provide an indicator of an incoming message or communication being received by the electronic device 201. The incoming message may for example be an electronic message, such as an email, a message received via a social networking website, an SMS (short message service) message, or a telephone call, for example. Thus, reference herein to "communication subsystem 211" may in fact be a reference to any one or more of the communication subsystem 211, the auxiliary input/output (I/O) subsystems 250, the NFC subsystem 265, the short-range wireless communications subsystem 262, and data port 252, and thus data (including messages) received and transmitted by/from the processor 240 thereby.

The electronic device 201 may, in some embodiments, provide a data communication mode, and optionally a voice communication mode. In the data communication mode, a received data signal of an electronic message, such as a text message, an email message, or Web page download will be processed by the communication subsystem 211 and input to the processor 240 for further processing. For example, a downloaded Web page may be further processed by a browser application or an electronic message may be processed by an messaging application and the message or page itself, or notification of its arrival via the communication subsystem 211, may be output to the display 204. A user of the electronic device 201 can compose data items, such as electronic messages; for example, using the input devices in conjunction with the display 204. These composed items may be transmitted through the communication subsystem 211 over the wireless network 101.

In the voice communication mode, the electronic device 201 provides telephony functions and operates as a typical cellular or mobile phone. Received voice signals can be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 based on program application data stored in memory such as persistent memory; for example, in the flash memory 244. As illustrated in FIG. 1, the software modules 221 include operating system software 223 and other software applications 225.

The program application data is executable by the processor 240 to permit various functions to be performed with the electronic device 201, whereby, for example, the application data can be received, processed and the display 204 can then be adapted by the processor 240 to display the application data itself in the form of data items, or notifications or representations thereof also in the form of data items. The input interface 206 permits interaction with the data items to perform actions there-upon. The application data, such as one or more electronic messages, may be received over the data network or short-range link at the communication subsystem 211 or data port 252 which passes this data to the processor 240. A program application, such as a message application which is being executed by the processor 240 may process the received data and generate a data item representative of each received message for display on the display 204. The data item may be generated by the processor 240 in the form of display data which is passed to the display 204 for causing or adapting the display of one or more data items on the display 204. The processor 240 may cause the data item to be displayed in an electronic mailbox in conjunction with other data items. The data items may be grouped according to their related content, e.g. sender, recipient, subject, conversation, such that items pertaining to sufficiently similar or identical content, are grouped with one or more of the grouped items being a parent item with the other item(s) of the group of items being child item(s).

Figure 2:
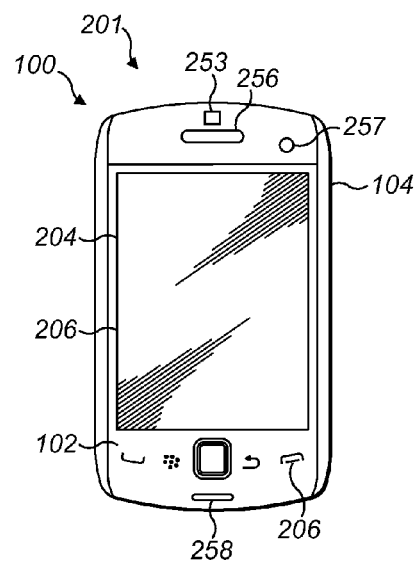
FIG. 2 is a plan view of the upper external side of one form of the electronic device usable by the user.

Referring now to FIG. 2, a front view of an electronic device 201 which in the depicted example of FIG. 2 is a communications device, such as a wireless, mobile, hand-held and/or portable communications device, e.g. mobile phone or smartphone, is illustrated. The electronic device 201 of FIG. 2 may offer advanced computing capability. For example, the electronic device 201 may have the ability to run third party applications which are stored on the electronic device 201. For example, the device may run a messaging application ('app') which allows the user to send and receive messages. The app messages may be stored in memory 244 and displayed on display 204. In the context of the claimed invention, the electronic device 201 may be a first or second electronic device 201, or both.

The electronic device 201 includes all of the components discussed above with reference to FIG. 1, or a subset of those components. The electronic device 201 includes a housing 104 which houses at least some of the components discussed above with reference to FIG. 1.

In the depicted embodiment, the electronic device 201 includes a display 204, which may be a touch-sensitive interface which acts as an input interface 206. The display 204 is disposed within the electronic device 201 so that it is viewable at a front side 102 of the electronic device 201. That is, a viewable side of the display 204 is disposed on the front side 102 of the electronic device. In the embodiment illustrated, the display 204 is framed by the housing 104.

The electronic device 201 also includes other input interfaces 206 such as one or more buttons, keys or navigational input mechanisms. In the embodiment illustrated, at least some of these additional input interfaces 206 are disposed for actuation at a front side 102 of the electronic device 201.

The electronic device 201 may also include a speaker 256. In the embodiment illustrated, the electronic device 201 includes a single speaker 256 which is disposed vertically above the display 204 when the electronic device 201 is held in a portrait orientation where its height is longer than its width. The speaker 256 may be disposed on the front face of the electronic device 201.

While the electronic device 201 of FIG. 2 includes a single speaker 256, in other embodiments, the electronic device 201 may include a greater number of speakers 256. For example, in at least some embodiments, the electronic device 201 may include a second speaker 256 which is disposed vertically below the display 204 when the electronic device 201 is held in a portrait orientation where its height is longer than its width (i.e. the orientation illustrated in FIG. 2).

The electronic device 201 also includes a microphone 258. In the embodiment illustrated, the microphone 258 is vertically disposed below the display 204 when the electronic device 201 is held in the portrait orientation. The microphone 258 and at least one speaker 256 may be arranged so that the microphone is in close proximity to a user's mouth and the speaker 256 is in close proximity to a user's ear when the user holds the phone to their face to converse on the electronic device 201.

The electronic device 201 also includes a front facing camera 253 which may be located vertically above the display 204 when the electronic device 201 is held in a portrait orientation where its height is longer than its width. The front facing camera 253 is located so that it may capture images of objects which are located in front of or surrounding the front side of the electronic device 201.

The electronic device 201 may also include an electromagnetic radiation source 257. The electromagnetic radiation source 257 is disposed on the front side 102 of the electronic device 201. In this orientation, electromagnetic radiation which is produced by the electromagnetic radiation source 257 may be projected onto objects which are located in front of or surrounding the front side of the electronic device 201. Such electromagnetic radiation (or the projection of electromagnetic radiation onto objects) may be captured on images detected by the camera 253.

Figure 3:
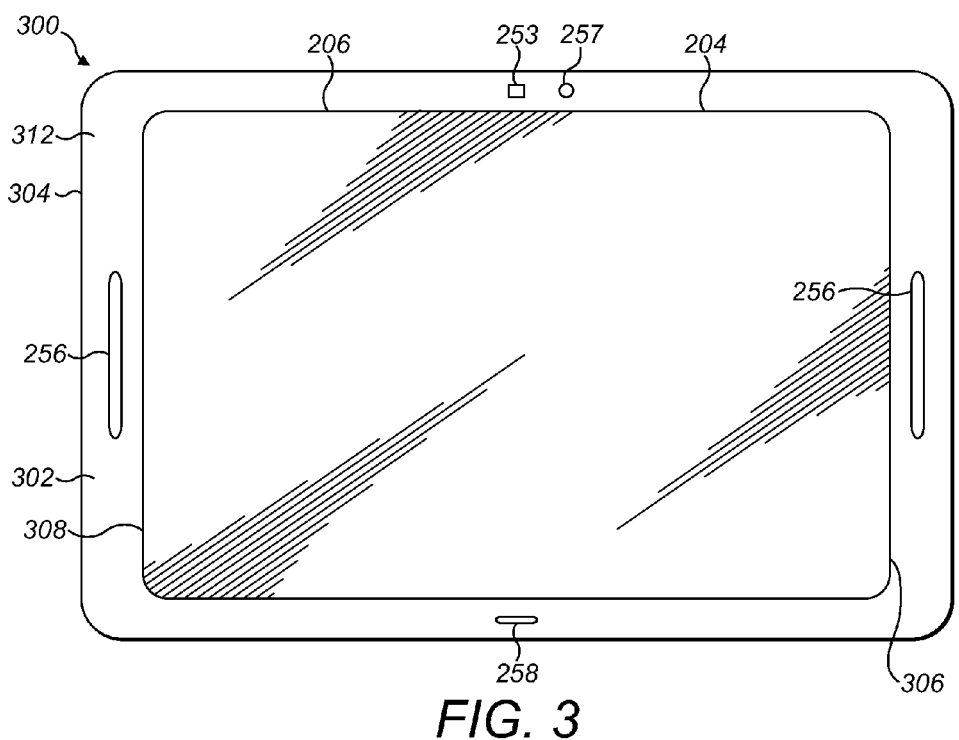
FIG. 3 is a plan view of the upper external side of another form of the electronic device usable by the user.

Referring now to FIG. 3, a front view of an alternative electronic device 300 comprising the display 204 is illustrated. The depicted electronic device 300 may be an external electronic display device separate or remote from the electronic device 201 or built into the housing of the electronic device 201. The electronic device 300 may be in communication with the external video output port 254. The electronic device 300 may include a housing 304 which houses one or more of the components discussed above with reference to FIG. 1, or all of the components.

The electronic device 300 includes a display 204, which, as explained above, may include or overlap with a touch-sensitive interface which acts as the input interface 206. The display 204 is disposed within the electronic device 300 so that it is viewable at a front side 302 of the electronic device 300. That is, a viewable side of the display 204 is disposed on the front side 302 of the electronic device 300. In the embodiment illustrated, the display 204 is framed within the housing 304 by frame 312.

The frame 312 can surround the display 204 and is the portion of the housing 304 which provides a border around the display 204. In at least some embodiments, the frame 312 is an active frame 312. That is, the frame has a touch-sensitive overlay which allows the electronic device 201 to detect a touch applied to the frame thus allowing the frame 312 to act as component of the input interface 206.

The electronic device 300 may optionally include a plurality of speakers 256. In the embodiment illustrated, the tablet includes two speakers 256. The two speakers 256 are disposed on opposing sides of the display 204. More particularly, when the electronic device 300 is positioned in a landscape orientation (such as the orientation illustrated in FIG. 3) where its width is longer than its height, one of the two speakers is disposed on a right side 306 of the display 204 and one of the speakers is disposed on the left side 308 of the display 204. Both speakers 256 may be disposed on the front side 302 of the electronic device 300.

The electronic device 300 may also optionally include a microphone 258. In the embodiment illustrated, the microphone 258 is vertically disposed below the display 204 when the electronic device is held in the landscape orientation illustrated in FIG. 3. The microphone 258 may be located in other locations in other embodiments.

The electronic device 300 may also include a front facing camera 253 which may be located vertically above the display 204 when the electronic device 300 is held in a landscape orientation (i.e. the orientation of FIG. 3). The front facing camera 253 may be located on the electronic device 300 so that it may capture images of objects which are located in front of or surrounding the front side of the electronic device 300.

The electronic device 300, which may be a completely discrete and independent additional electronic device (similar or identical to electronic device 201) and contain the functionality of such a device completely independently from device 201. In this regard, the electronic device 300 may be being controlled by electronic device 201 so that the display 204 shows display data output by the device 201, separate from or in addition to display data generated internally by the device 300 acting as an additional electronic device. For example, the electronic device may be acting as a mirroring device for a display generated by device 201. Alternatively, the device 300 may be a standalone device, such as an integrated personal computer containing display 204 or a tablet computer.

Figure 4:
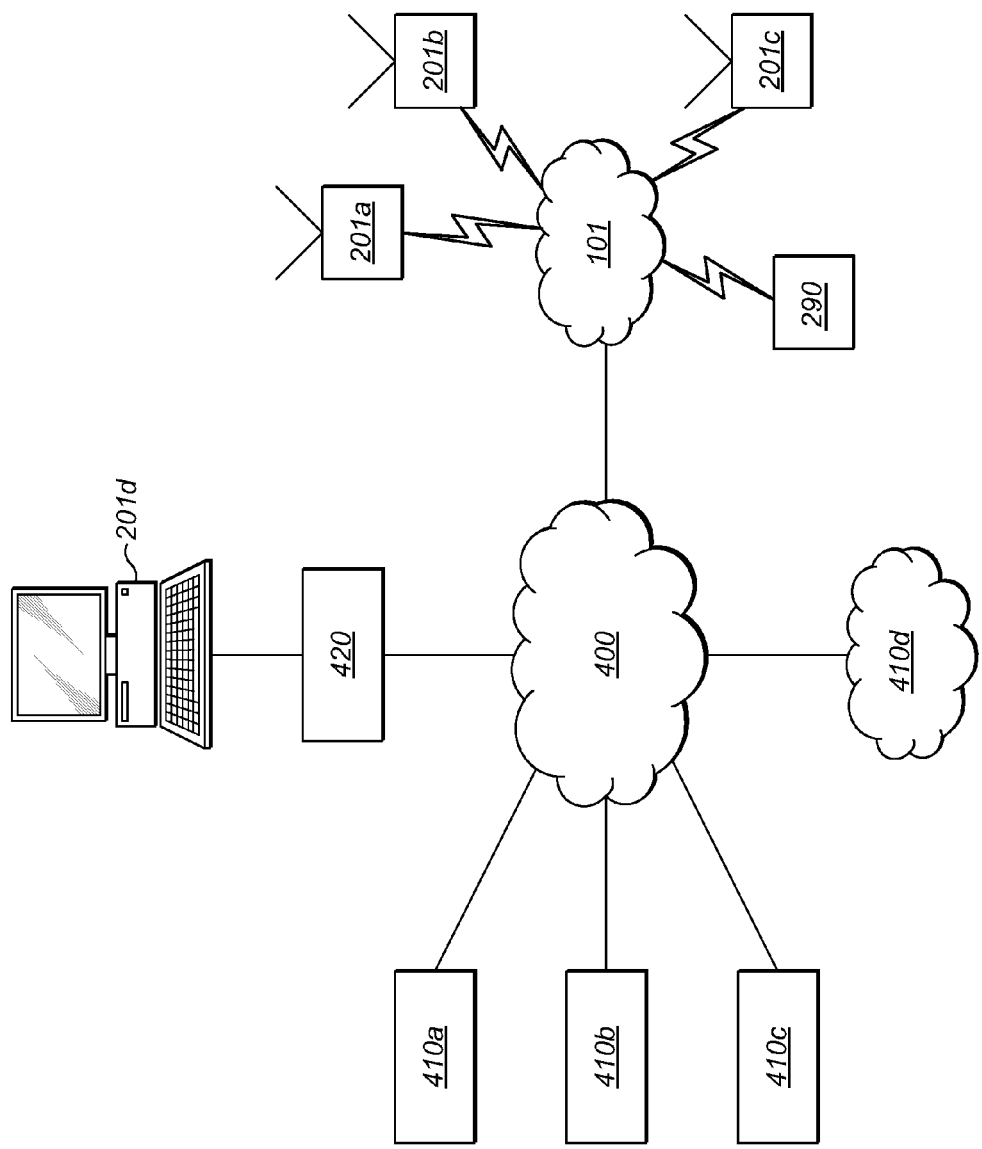
FIG. 4 is a schematic diagram of a system in which the aforementioned electronic devices can be employed.

FIG. 4 shows a system of networked apparatus by which electronic communications can be sent and received using multiple electronic devices 201a, 201b, 201c, one of which may include or be device 300. Referring to FIG. 4, electronic devices 201a, 201b and 201c are connected to wireless network 101 to perform voice and data communications. Wireless network 101 is also connected to the communications network 400, e.g. Internet. Electronic device 201d may be a computing device, which may be a personal computer, e.g. desktop, laptop or notebook computer, having one or more of the components and/or functionality of device 201 described above, and connected by a wired or wireless communication link to network 420, which is also connected to or forms part of the communications network 400. Electronic devices 201b and 201c may be computing or communication devices having one or more of the components and/or functionality of device 201 or 300 described above. As depicted, electronic devices 201a, b, c, d may access the communications network 400 to perform data communications therewith and with each other.

Servers 410a, 410b, 410c and 410d are also connected to the communications network 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers transmitting and receiving data, such as electronic messages to, from and/or between electronic devices 201a, 201b, 201c and 201d.

Other servers and services may of course be provided allowing users of electronic devices 201a, 201b, 201c and 201d to send and receive electronic communications or messages by, for example, Voice over IP phone calls, video IP calls, video chat, group video chat, blogs, file transfers, instant messaging, and feeds.

Wireless network 101 may also support electronic communications without using communications network 400. For example, a user of electronic device 201b may use wireless network 101 to make telephony calls, video calls, send text messages, send multimedia messages, and send instant messages to communications device 201c, and to display application data on a display screen of the external display device 300, or control the display of application data.

The embodiment shown in FIG. 4 is intended to be non-limiting and additional network infrastructure may of course be provided, such as a Public Switched Telephone Network (not shown), which may be used, for example, to make telephony calls using one communication device 201a, 201b, 201c or 201d to another, or to a wired phone (not shown).

In order to explain certain example modes of operation, reference is made below to FIGS. 5, 6 and 7.

Figure 5:
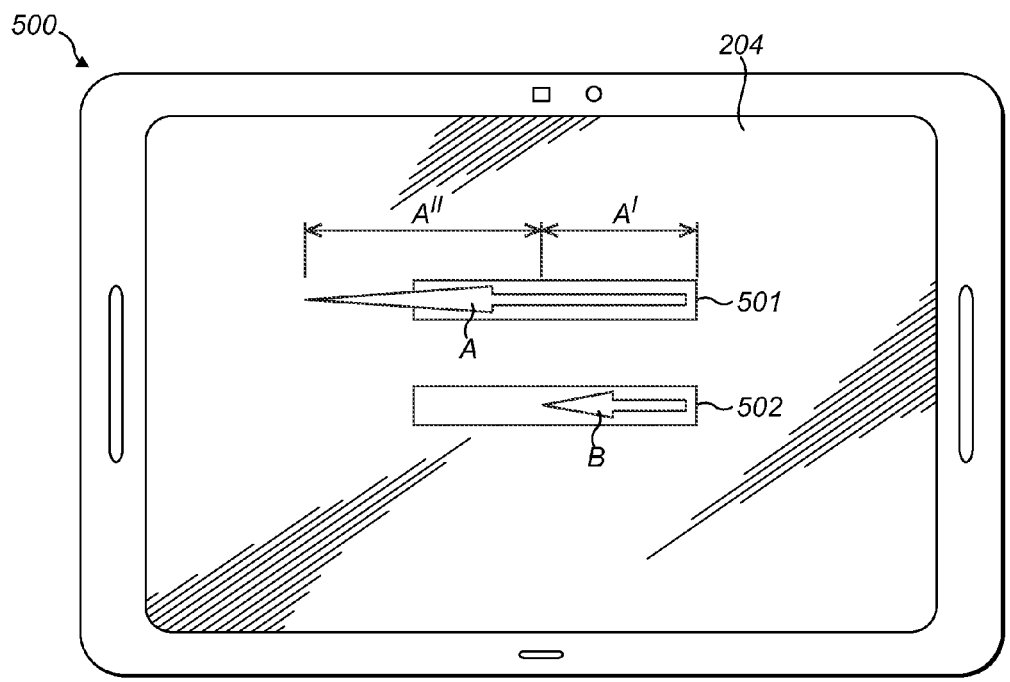
FIG. 5 is a plan view of the electronic device of FIG. 3, illustrating items displayed on display of the electronic device and the selection of those items by the user.

As illustrated in FIG. 5, the electronic device 500, which for illustrative purposes is the electronic device 300 of FIG. 3, but which may alternatively be the electronic device 201 of FIG. 2, is configured to display on its display 204 a plurality of items comprising a first item 501 and a second item 502. Reference is made below to gestures, but it will be understood that this may include any user input provided through input interface 206, e.g. input provided via a pointing device.

In the illustrated example, the first item 501 is linked to one or more additional items which are not displayed. The first item 501 is therefore a parent item having a number of child items (i.e. the one or more additional items linked to the first item 501). The one or more additional items linked to the first item 501 may be accessed via the first item 501, for example, by opening the first item 501 to display the linked items. Alternatively, the one or more additional items may be displayed on the screen alongside the first item 501, rather than being hidden from view.

The second item 502 of the illustrated example is not linked to any other items. The second item 502 can therefore be considered a parent item without any child items.

The parent items, with or without child items, may be displayed in a list format with the child items hidden from view.

The first 501 and second 502 items are each selectable by application of a gesture directed at the item to perform an action on the item, for example to delete the selected item, to move the selected item to a folder or to a different folder, etc. As will be described in more detail below, a user can perform an action on a group of items comprising the first item 501 and the one or more additional items linked to the first item 501 by applying a gesture directed at the first item.

In an embodiment, the action that is performed on the item or group of items is the deletion of the selected item or group of items from the display, for example to delete the item or group of items from the device's memory or to move the item or group of items to a folder for deleted items.

The present invention relates to the distinction between a gesture used to delete a group of items, i.e. the parent item together with its child items, and a gesture used to delete a single item, e.g. a parent item which does not have any child items (i.e. the second item 502) or a child item alone.

In an embodiment, the child items are deleted when the parent item is deleted. Thus, in a hierarchical list, meaning a list of parent items that can have child items, there needs to be a way for the user to indicate that the child items should be deleted as well as the parent item when the parent item is deleted. Deleting such items with a simple gesture can be risky, since a lot of information can be deleted by mistake if not careful. This disclosure relates to a way to make it more difficult to delete parent items with child items, for example to avoid accidently deleting child items.

Returning to FIG. 5, to select the first item 501, together with the additional items which are linked to the first item 501, the user performs a first gesture on the first item 501, which for illustrative purposes is indicated by arrow A. To select the second item 502, which is a single item with no other items linked to it, the user performs a second gesture on the second item 502, which is indicated by arrow B. As explained previously, the item (i.e. for the second item 502) or the group of items (i.e. for the first item 501 together with the one or more additional items) are selected to perform an action on the item or group of items. The action may be performed upon application of the gesture A, B to select the item or the group of items. For example, where the action is the deletion of the item or items, the application of gesture A directed at the first item 501 automatically deletes the group of items comprising the first item 501 and the one or more additional items upon finishing gesture A, and the application of gesture B directed at the second item 502 automatically deletes the second item 502 upon finishing gesture B. Optionally, a notification can be displayed on the display to warn the user that if the gesture is completed, the selected item or group of items will be deleted.

The gesture A used to delete the group of items may be more complicated in at least one respect that the gesture B used to delete a single item (i.e. the second item 502), to prevent a user from unintentionally deleting the child items of a parent item (i.e. to prevent the user accidently deleting the one or more additional items linked to the first item 501).

In the illustrated example of FIG. 5, gesture A is more complicated than gesture B by being longer in length than gesture B. Gesture A may comprise two components, A' and A", where the first component A' of gesture A is the same as gesture B. The second component A" of gesture A makes it more complicated than gesture B. In an embodiment, application of the first component A' may select the first item 501 and application of the second component A' may delete the group of items comprising the first item 501 and the one or more additional items linked to it.

Instead of the second component A" illustrated, the user may be required to provide confirmation of an intention to delete the group of items by an alternative second component A", for example by tapping a button stating "OK" or "delete", or by any other suitable gesture.

The disclosed embodiments encompass all alternatives for making gesture B different, e.g. more complicated, in at least one respect to gesture A, or vice-versa. For example: gesture A could be held for longer than gesture B, gesture A could involve a more complicated input shape than gesture B (such as more changes in direction than gesture B); and/or gesture A could be longer in distance moved across the display 204 (inc. the touch sensitive interface).

The gestures A, B of FIG. 5 may be performed on a touch-sensitive input interface of the device 500 by the user swiping his/her finger across the item, with the path of their finger (shown by arrows A and B) detected by the touch-sensitive interface. Alternatively, the user could perform the gesture by any other means and on any suitable device, e.g. by dragging a cursor across a screen, by clicking a cursor on the item or by gesturing with their hand, head or eye across a motion sensor, etc.

For embodiments in which child items are initially hidden from view, each item of the group of items to be deleted may be displayed on the display as the gesture A is being performed, to enable the user to view the group of items being deleted. As illustrated in FIG. 6, the items of the group 510 may be displayed in a list format alongside or with the first item 501 as the gesture A is being performed. The group of items 510 that is displayed whilst the gesture A is being performed may include the first item 501 together with the additional items that are linked to the first item 501, or it may include the additional items only, since the first item 501 is already displayed on the display 204.

The items described above may be indicative of any type of information. In an embodiment, the items are indicative of messages, for example email messages, calendar messages or entries, text (SMS) messages, or app messages. However, if preferred, the items could be indicative of music files, drawing files, written documents, or any other type of item of information that may have linked files. The items themselves, e.g. messages, or information pertaining thereto, e.g. messages, may be stored on the electronic device 500 in memory 244, or stored remotely on another device 201*a, b, c, d*, such as device 201*d*, which may be a message server accessible over network 400. Wherever the items or information pertaining thereto are stored, they may be acted upon, e.g. deleted, in accordance with the disclosed methods.

In the embodiment in which the items are indicative of messages, the parent message(s) can be indicative of the first or last message of a connected chain or group of messages. By deleting the first item 501, the user is able to delete the whole chain or group of messages at once, e.g. the whole conversation at once. The additional items linked to the parent item may be displayed in a list format as the user is applying gesture A to show the user that all of the messages of the conversation are to be deleted. Alternatively, any other means to alert the user to the deletion of child items may be displayed, for example a number representing the number of items to be deleted may be displayed on the display 204.

In an additional embodiment, as well as the functionality discussed above, it is possible to delete the first item 501 (and none of the one or more additional items linked to that first item) by application of gesture B directed at the first item 501. In this embodiment, the first item 501 and no other item will be deleted by the application of gesture B directed at the first item 501, and the first item 501 and the one or more additional items can be deleted as a group of items 510 upon application of gesture A directed at the first item 501. This provides the user with the ability to delete the parent item by itself or the parent item together with its child items.

The processing circuitry 240 may be configured such that, by selecting the first item 501, for example by clicking or tapping on it, the one or more additional items that are linked to it are displayed. This may allow the user to delete a single child item by applying gesture B directed at the child item.

The processing circuitry 240 of the device 500 may be configured to move the selected item with the gesture. For example, where the input interface 206 is a touch-sensitive interface display, the user may hold down his/her finger on the item which is to be deleted and then swipe in a direction, e.g. to the left as shown by arrows A and B in FIG. 5. The processing circuitry 240 may be configured to display the item as it tracks the user's finger movement across the screen. After a certain dragged distance, a notification may be displayed that indicates that if the gesture is completed (and optionally the finger is released at the end point of the gesture), the item is deleted. As discussed previously, if the selected item has child items, the child items can be displayed as the gesture is being applied to the screen. In this embodiment, the child items may be displayed to follow the finger as well as the parent item as the user drags her/his finger across the screen.

From the above description, it will be understood that a user can select a first item by application of a first gesture A directed at the first item to perform an action on a group of items (comprises the first item) and can select a second item by application of a second gesture B directed at the second item to perform an action on the second item alone. For a parent item "parent 1" having one or more child items "child 1", "child 2", the first item may be the parent item "parent 1" and the second item may be the parent item "parent 1" or one of its child items "child 1" or "child 2". Alternatively the second item may be a parent item "parent 2" or a child item "child 3" distinct from the first item "parent 1" (as illustrated in FIGS. 5 and 6).

It will be understood that such a hierarchal structure can be applied to the other possible data items as discussed above. For example, if the items are indicative of music files, the parent item may represent a particular song of an album or artist, and the child items the other songs of the album or by that artist. The user can then delete the particular song of the album or artist by the application of gesture B to the parent item or they can delete the whole set of songs of the album or artist by the application of gesture A directed at the parent item.

Figure 6:
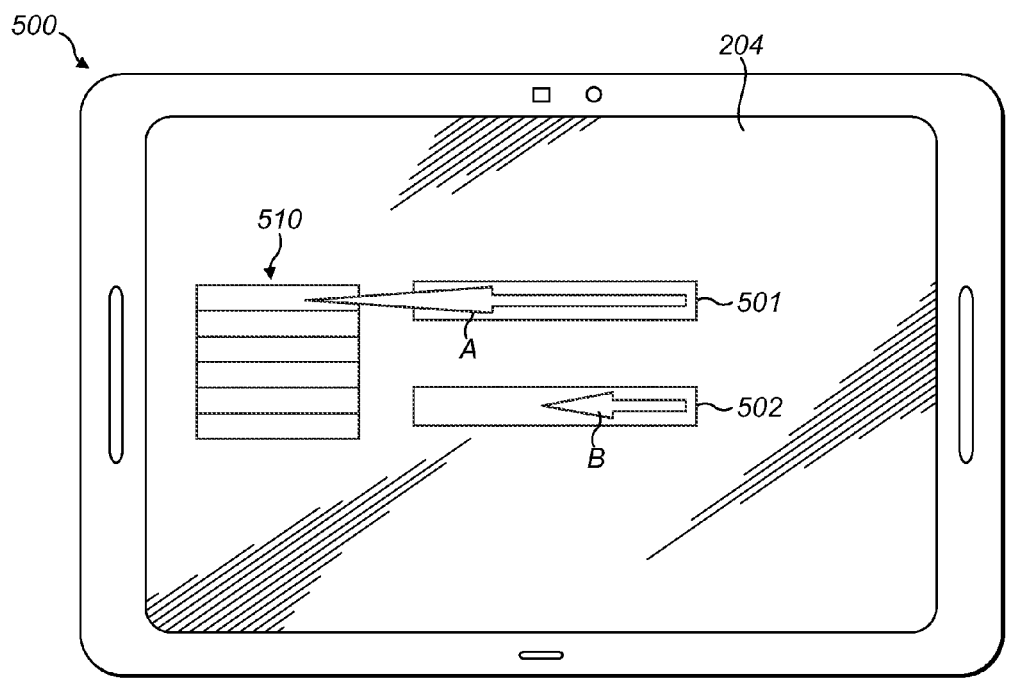
FIG. 6 is a plan view of the electronic device of FIG. 3, illustrating items displayed on the display of the electronic device and the selection of those items by the user.
Figure 7:
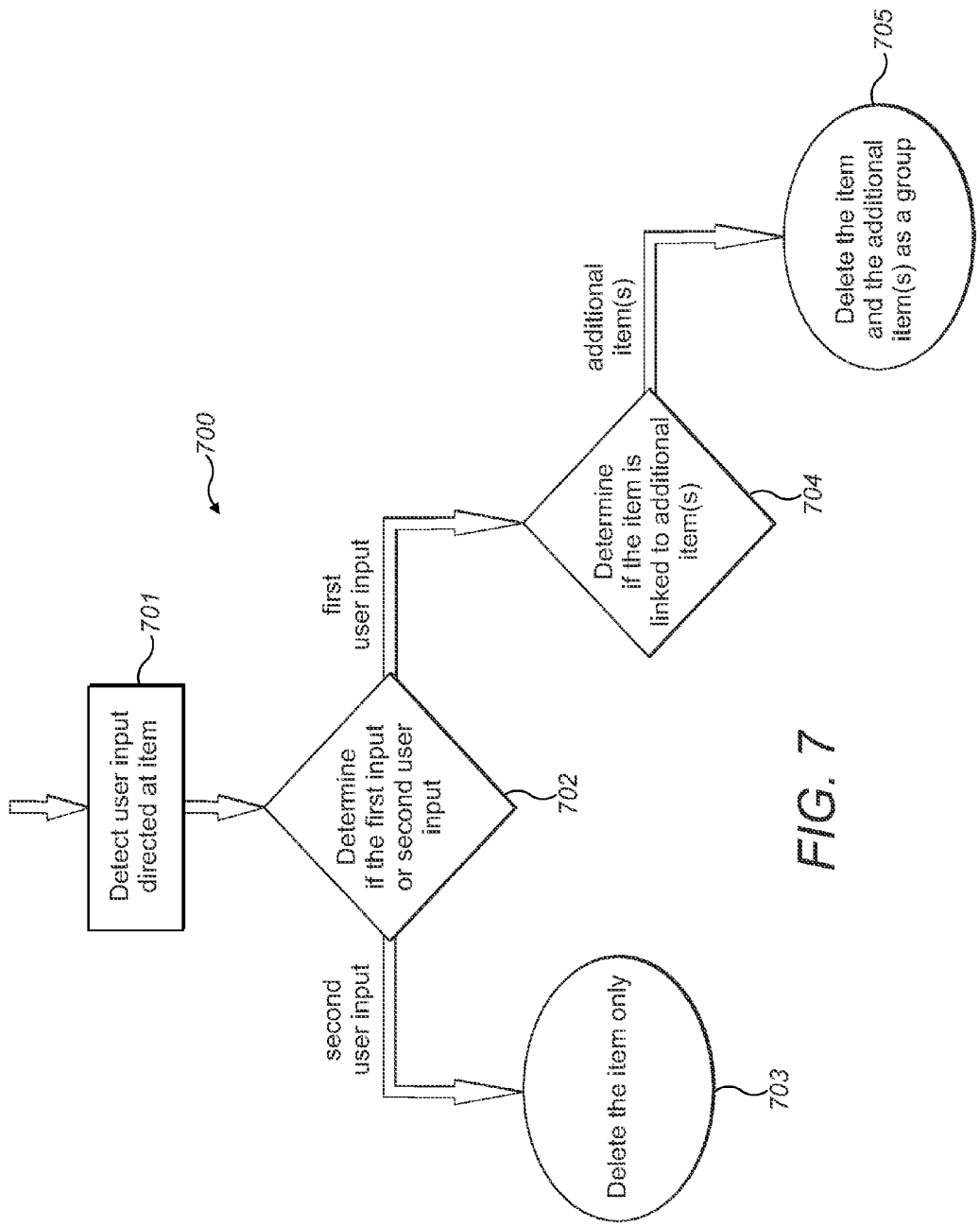
FIG. 7 is a flow chart of a method implemented in accordance with this disclosure.

FIG. 7 is a flow chart depicting a method 700 performed by the processor 240 of the electronic device 201, 300 or 500, as described in association with FIGS. 5 and 6.

At block 701, the processor 240 detects user input directed at an item (e.g. 501 or 502) displayed on the display 204.

At block 702, the processor 240 determines if the user input corresponds to a first user input (e.g. gesture A as shown in FIGS. 5 and 6) or a second user input (e.g. gesture B as shown in FIGS. 5 and 6).

Upon determining that the user input is the second user input (e.g. gesture B), at block 703, the processor 240 deletes the item only. With reference to the embodiment discussed in FIGS. 5 and 6, the single deleted item could correspond to the first item 501 and none of the one or more additional items, the second item (which is linked to no other item), or one of the child items that is linked to the one or more additional items, if these items are displayed on the display 204 for a user to direct an input, e.g. by performing gesture B across one of the one or more additional items.

If the first user input is detected, the processor 240 determines, at block 704, whether the item (that the user input was directed at) is linked to one or more additional items.

At block 705, upon determining that the item is linked to one or more additional items (e.g. the first item 501 of FIGS. 5 and 6 which is linked to one or more additional items), the processor 240 deletes the item along with the one or more additional items linked to that item.

In a further step (not shown in FIG. 7) of the method 700, upon determining that the item is not linked to one or more additional items and that the user input is the first user input, the processor may be configured to perform no action on the item, i.e. the item is not deleted. Alternatively, the processor may be configured to delete the single item. In this embodiment, single items can be deleted by either user input, but a group of items can only be deleted by the first gesture which is more complicated in at least one respect that the second gesture.

While FIG. 7 has been described in relation to the action being the deletion of the item(s), the action to be performed on the item(s) can be any other suitable action, as discussed previously.

Furthermore, the processor 240 can be configured to determine if the item (at which the user input is directed) is linked to one or more additional items (block 704) before or after determining whether the user input is the first user input or the second user input (block 702). The method covers both orders in which the two steps can be performed.

While the present application is primarily described in terms of devices 201, 300 and 500 and corresponding methods, the devices may include components for performing at least some or all of the example aspects and features of the described methods, be it by way of hardware components (such as the memory 244, 246, 248 and/or the processor 240), software or any combination of the two. Moreover, an article of manufacture for use with the device, such as a pre-recorded storage device or other similar computer-readable medium including program instructions recorded thereon may direct the device to facilitate the practice of the described methods. It should be understood that such devices and articles of manufacture come within the scope of the present application.

The term "computer-readable medium" as used herein means any medium which can store instructions for use by or execution by a computer, processing circuitry or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)). The computer-readable medium may be a non-transitory computer-readable medium.

It will be appreciated that the foregoing discussion relates to particular embodiments. However, in other embodiments, various aspects and examples may be combined.

The invention claimed is:

1. A method in an electronic device having a display and a touch-sensitive interface overlaid on the display, the method comprising:
   detecting a user input directed at an item displayed on the display and determining whether the user input is a first user input or a second user input, the first user input of greater complexity than the second user input, wherein the first user input comprises a swipe on the touch-sensitive interface of a first length across the item displayed on the display and the second user input comprises a swipe on the touch-sensitive interface of a second length across the item displayed on the display, wherein the first length is longer than the second length;
   when the item is a parent item linked to one or more child items and the detected user input is the first user input:
      selecting the parent item and the one or more child items as a group of items, for performing an action on only the group of items;
      if the one or more child items are initially hidden from view, displaying the one or more child items of the group of items in a list format alongside or with the parent item on the display as the first user input is being performed; and
      automatically performing the action on the group of items upon finishing the first user input; and
   when the detected user input is the second user input and the item is selected for performing the action on the item and no other item upon a determination that the item is not linked to one or more additional items:
      selecting the item for performing the action on only the item; and
      performing the action on only the item upon finishing the second user input.

2. The method of claim 1, further comprising determining whether the item displayed on the display is a parent item linked to one or more child items, and wherein:
   upon a determination that the item is a parent item linked to one or more child items and that the detected user input is the first user input, selecting the parent item and the one or more child items as the group of items, for performing the action on the group of items; and
   upon a determination that the detected user input is the second user input, selecting the item for performing the action on only the item.

3. The method of claim 2, further comprising performing the action on the group of items in response to the determination that the item is a parent item linked to one or more child items and that the detected user input is the first user input.

4. The method of claim 3, wherein the first user input comprises a first component and a second component and wherein an application of the first component of the first user input selects the first item and the application of the second component of the first user input performs the action on the group of items.

5. The method of claim 4, wherein the second user input is the same as the first component of the first user input.

6. The method of claim 2, further comprising performing the action on only the item in response to the determination that the detected user input is the second user input.

7. The method of claim 2, wherein upon a determination that the item is a parent item linked to one or more additional items and that the detected user input is the second user input, selecting the item, for performing the action on the item and none of the one or more child items.

8. The method of claim 1, wherein the action performed is deletion of the item or the group of items.

9. The method of claim 1, wherein the one or more additional items are indicative of messages.

10. The method of claim 9, wherein the one or more child items comprise one or more sub-items that are linked to the item.

11. The method of claim 10, wherein the item is indicative of a message from a chain of messages and the one or more sub-items are indicative of one or more additional messages of the chain of messages.

12. The method of claim 11, wherein the item is indicative of a most recently received or sent message in the chain of messages.

13. The method of claim 10 wherein the item is displayed in the display, with the sub-items being hidden from view.

14. The method of claim 13, wherein the method comprises displaying on the display the one or more sub-items linked to the item when the item is selected by detection of the first user input.

15. The method of claim 14, wherein the one or more sub-items are displayed in a list on the display, alongside or together with the item.

16. The method of claim 1, wherein the first user input is a first gesture input via the touch-sensitive input interface, and the second user input is a second gesture input by the touch-sensitive input interface, wherein the first gesture is different in at least one respect from the second gesture.

17. An electronic device comprising:
a display that displays an item;
a touch-sensitive overlay overlaid on the display; and
a processor that detects a user input directed at an item displayed on the display and determines whether the user input is a first user input or a second user input, the first user input of greater complexity than the second user input, wherein the first user input comprises a swipe on the touch-sensitive interface of a first length across the item displayed on the display and the second user input comprises a swipe on the touch-sensitive interface of a second length across the item displayed on the display, wherein the first length is longer than the second length;
the processor further in response to the receipt of the first user input directed at the item and when the item is a parent item linked to one or more child items:
selects the parent item and the one or more child items to perform an action on only the group of items together;
if the one or more child items are initially hidden from view, displaying the one or more child items of the group of items in a list format alongside or with the parent item on the display as the first user input is being performed; and
automatically performs the action on the group of items upon finishing the first user input; and
in response to the receipt of the second user input directed at the item and the item is selected for performing the action on the item and no other item upon a determination that the item is not linked to one or more additional items:
selects the item to perform the action on only the item; and
performs the action on only the item upon finishing the second user input.

18. The electronic device of claim 17, wherein the processor further determines whether the item displayed on the display is a parent item linked to one or more child items and wherein the processor further:
in response to the receipt of the first user input directed at the item and the determination that the item is a parent item linked to one or more child items, selects the parent item and the one or more child items to perform the action on the group of items together; and
in response to the receipt of the second user input directed at the item, selects the item to perform the action on only the item.

19. The electronic device of claim 18, wherein the processor further:
in response to the receipt of the second user input directed at the item and the determination that the item is a parent item linked to one or more child items, selects the item to perform the action on the parent item and none of the one or more child items.

20. The electronic device of claim 17, wherein the first user input is a first gesture input via the touch-sensitive input interface, and the second user input is a second gesture input by the touch-sensitive input interface, wherein the first gesture is different in at least one respect from the second gesture.

21. The electronic device of claim 20, wherein the processor performs the action on the group of items in response to the receipt of the first user input directed at the item and the determination that the item is a parent item linked to one or more child items.

22. The electronic device of claim 21, wherein the first user input comprises a first component and a second component and wherein the processor further:
in response to an input of the first component of the first user input directed at the item, selects the item;
in response to an input of the second component of the first user input, performs the action on the group of items together.

23. The electronic device of claim 22, wherein the second user input is the same as the first component of the first user input.

24. The electronic device of claim 20, wherein the processor performs the action on the item in response to the receipt of the second user input directed at the item and the determination that the item is not linked to one or more additional items.

25. The electronic device of claim 17, wherein the action performed by the processor is deletion of the item or the group of items.

26. The electronic device of claim 17, wherein the one or more child items are indicative of messages.

27. The electronic device of claim 26, wherein the one or more child items comprise one or more sub-items that are linked to the item.

28. The electronic device of claim 27, wherein the item is indicative of a message from a chain of messages and the one or more sub-items are indicative of one or more additional messages of the chain of messages.

29. The electronic device of claim 28, wherein the item is indicative of a most recently received or sent message in the chain of messages.

30. The electronic device of claim 26, wherein the processor displays the item on the display, with the sub-items being hidden from view.

31. The electronic device of claim 30, wherein the processor displays on the display the one or more sub-items linked to the item when the item is selected in response to input of the first user input.

32. The electronic device of claim 31, wherein the processor displays the one or more sub-items in a list on the display, alongside or together with the item.

33. A non-transitory computer-readable medium having stored thereon executable instructions which, when executed by a processor, cause the processor to:
- detect a user input directed at an item displayed on a display having a touch-sensitive interface overlaid thereupon and determine whether the user input is a first user input or a second user input, the first user input of greater complexity than the second user input, wherein the first user input comprises a swipe on the touch-sensitive interface of a first length across the item displayed on the display and the second user input comprises a swipe on the touch-sensitive interface of a second length across the item displayed on the display, wherein the first length is longer than the second length;
- when the item is a parent item linked to one or more child items and the detected user input is the first user input:
  - select the parent item and the one or more child items as a group of items, for performing an action on only the group of items;
  - if the one or more child items are initially hidden from view, displaying the one or more child items of the group of items in a list format alongside or with the parent item on the display as the first user input is being performed; and
  - automatically perform the action on the group of items upon finishing the first user input; and
- when the detected user input is the second user input and the item is selected for performing the action on the item and no other item upon a determination that the item is not linked to one or more additional items:
  - select the item for performing the action on only the item; and
  - perform the action on only the item upon finishing the second user input.

* * * * *